(12) United States Patent
Prosser

(10) Patent No.: US 9,007,027 B2
(45) Date of Patent: Apr. 14, 2015

(54) CHARGE MANAGEMENT FOR ENERGY STORAGE TEMPERATURE CONTROL

(75) Inventor: Ronald D Prosser, Huntington Beach, CA (US)

(73) Assignee: Green Charge Networks LLC, Santa Clara, CA (US)

( * ) Notice: Subject to any disclaimer, the term of this patent is extended or adjusted under 35 U.S.C. 154(b) by 664 days.

(21) Appl. No.: 13/362,157

(22) Filed: Jan. 31, 2012

(65) Prior Publication Data

US 2013/0193928 A1 Aug. 1, 2013

(51) Int. Cl.
*H02J 7/00* (2006.01)
*H02J 7/14* (2006.01)
*H02J 7/04* (2006.01)
*H02J 7/08* (2006.01)

(52) U.S. Cl.
CPC .............. *H02J 7/047* (2013.01); *H02J 7/1453* (2013.01); *H02J 7/0091* (2013.01); *H02J 7/0008* (2013.01); *H02J 7/0042* (2013.01); *H02J 7/087* (2013.01); *H02J 7/0088* (2013.01)

(58) Field of Classification Search
USPC ......... 320/130, 144, 153, 154, 166, 167, 150, 320/103; 429/120, 134, 433, 441, 442, 61, 429/62
See application file for complete search history.

(56) References Cited

U.S. PATENT DOCUMENTS

| | | | |
|---|---|---|---|
| 1,831,553 A | 11/1931 | Byles | |
| 4,023,043 A | 5/1977 | Stevenson | |
| 4,277,691 A | 7/1981 | Lunn | |
| 4,520,274 A | 5/1985 | Stants | |
| 5,703,442 A | 12/1997 | Notohamiprodjo | |
| 5,816,491 A | 10/1998 | Berkeley | |
| 5,871,859 A * | 2/1999 | Parise | 320/150 |
| 6,037,758 A | 3/2000 | Perez | |
| 6,067,482 A | 5/2000 | Shapiro | |
| 6,134,124 A | 10/2000 | Jungreis | |
| 6,172,432 B1 | 1/2001 | Schnackenberg | |
| 6,440,602 B1 * | 8/2002 | Morita | 429/120 |
| 6,441,588 B1 * | 8/2002 | Yagi et al. | 320/139 |
| 6,476,519 B1 | 11/2002 | Weiner | |
| 6,522,031 B2 | 2/2003 | Provanzana | |
| 6,542,791 B1 | 4/2003 | Perez | |
| 6,563,048 B2 | 5/2003 | Holt | |
| 6,652,330 B1 | 11/2003 | Wasilewski | |
| 6,785,592 B1 | 8/2004 | Smith | |
| 6,889,122 B2 | 5/2005 | Perez | |
| 6,902,837 B2 | 6/2005 | McCluskey | |
| 7,060,379 B2 | 6/2006 | Speranza | |
| 7,132,833 B2 | 11/2006 | Layden | |
| 7,142,949 B2 | 11/2006 | Brewster | |

(Continued)

*Primary Examiner* — Edward Tso
*Assistant Examiner* — Alexis A Boateng
(74) *Attorney, Agent, or Firm* — Richard C. Galati; Holland & Hart LLP

(57) ABSTRACT

Charging and discharging an energy storage device (ESD) generates heat and may prevent its temperature from dropping to unsafe levels. By monitoring and managing the charge and discharge of an ESD with respect to the periods of time in which demand charges are determined, the heating will have minimal adverse effect on demand charges. ESDs may also exchange energy in a controlled manner for heating purposes and reduce reliance on utility grid-based energy sources. ESD heating may also be made more efficient by offsetting the heating with load shedding during charging periods. Pre-charging the ESD while heating or preheating the ESD by charging and discharging can prevent new maximum demand levels from appearing and thereby limit increases in demand charges.

21 Claims, 8 Drawing Sheets

(56) References Cited

U.S. PATENT DOCUMENTS

| | | |
|---|---|---|
| 7,456,604 B2 * | 11/2008 | Kurokami et al. ............ 320/101 |
| 7,863,866 B2 | 1/2011 | Wolf |
| 7,894,946 B2 | 2/2011 | Kulyk |
| 7,943,250 B1 | 5/2011 | Johnson |
| 8,024,077 B2 | 9/2011 | Torre |
| 2001/0043013 A1 | 11/2001 | Abe |
| 2003/0230443 A1 | 12/2003 | Cramer |
| 2004/0084965 A1 | 5/2004 | Welches |
| 2005/0043862 A1 | 2/2005 | Brickfield |
| 2006/0017328 A1 | 1/2006 | Bryde |
| 2007/0005192 A1 | 1/2007 | Schoettle |
| 2008/0167756 A1 | 7/2008 | Golden |
| 2008/0169790 A1 * | 7/2008 | Gozdz et al. ................. 320/160 |
| 2008/0183337 A1 | 7/2008 | Szabados |
| 2008/0191675 A1 | 8/2008 | Besser |
| 2008/0203975 A1 | 8/2008 | Burlak |
| 2009/0153102 A1 * | 6/2009 | Guatto et al. ................. 320/128 |
| 2009/0157529 A1 | 6/2009 | Ehlers |
| 2009/0222143 A1 | 9/2009 | Kempton |
| 2009/0243540 A1 | 10/2009 | Choi |
| 2009/0254396 A1 | 10/2009 | Metcalfe |
| 2009/0317694 A1 | 12/2009 | Angquist |
| 2010/0017045 A1 | 1/2010 | Nesler |
| 2010/0039062 A1 * | 2/2010 | Gu et al. ....................... 320/101 |
| 2010/0104935 A1 * | 4/2010 | Hermann et al. ............. 429/120 |
| 2010/0253244 A1 | 10/2010 | Snook |
| 2010/0262296 A1 | 10/2010 | Davis |
| 2010/0271802 A1 | 10/2010 | Recker |
| 2010/0295514 A1 | 11/2010 | Burlak |
| 2010/0327800 A1 | 12/2010 | Reineccius |
| 2011/0004358 A1 | 1/2011 | Pollack |
| 2011/0046806 A1 | 2/2011 | Nagel |
| 2011/0050158 A1 * | 3/2011 | MacDonald et al. ......... 320/101 |
| 2011/0074350 A1 * | 3/2011 | Kocher ......................... 320/109 |
| 2011/0121791 A1 * | 5/2011 | Basham et al. ............... 320/162 |
| 2012/0029724 A1 * | 2/2012 | Formanski et al. ........... 700/300 |

* cited by examiner

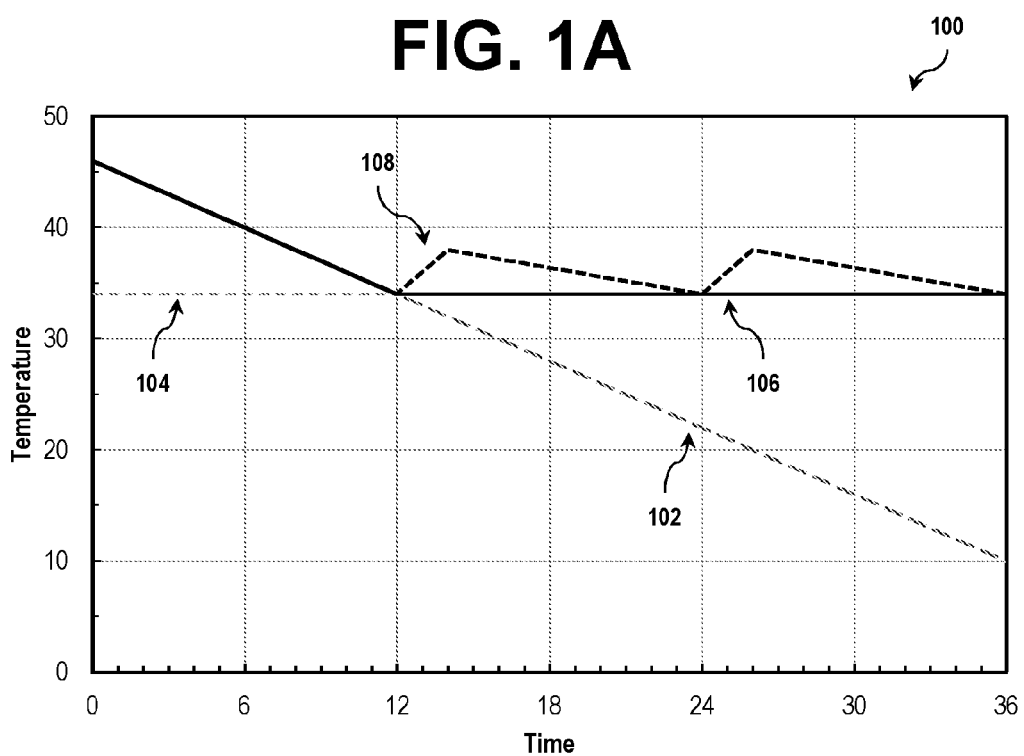
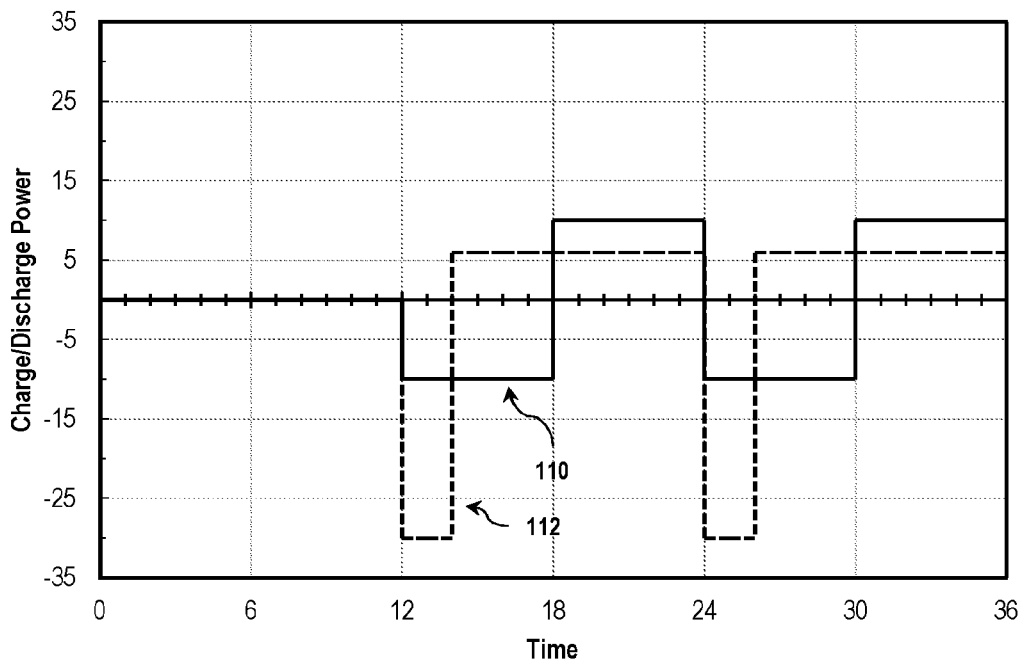

CHARGE MANAGEMENT FOR ENERGY STORAGE TEMPERATURE CONTROL

CROSS-REFERENCE TO RELATED APPLICATIONS

Not applicable.

BACKGROUND

The present invention is directed to the fields of energy storage device (ESD) state of charge management, energy storage temperature control, electrical distribution grid demand charge management, and related fields.

With the electrical demand of a customer in today's electrical distribution grid rising at a restless pace, electricity providers have had to find ways to prevent or discourage overloading of the transformers, feeders, and mains across their distribution networks. In some areas, utilities have adopted the practice of having two separate components in their charges, including a component for overall electrical usage in kilowatt-hours and a component for peak demand. Peak demand billings, called "demand charges," are electricity bills assessed due to the highest consumption drawn by a customer during a billing cycle. When calculating demand charges, utility providers typically measure facility energy usage over short predetermined time periods (e.g., every ten or fifteen minutes), calculate and store the average level of demand for each of these periods, and then, at the end of a billing cycle (e.g., at the end of each month), generate the demand charge billed to the customer based on the highest consumption average experienced in that cycle. Thus, even brief spikes in demand may result in high demand charges.

Demand charge management is the practice of reducing demand charges. It usually involves reducing the peak electrical load drawn at a site at times when utility costs are high or when consumption at the site is high, thereby reducing the averaged demand across the entire billing cycle or subdivisions thereof. Consumers have used peak mitigation and peak shaving techniques to manage demand charges, wherein an ESD is discharged to the grid or loads are shed from the grid (e.g., turned off, throttled, or diverted to other energy sources) when a spike or peak in the electrical demand occurs in order to offset or nullify the contribution of the peak to the demand averages calculated by the utility provider.

In recent years, electric vehicle charging equipment has become a common source of these peaks, since they charge EVs for relatively brief periods of time at relatively high power levels when compared to the consumption "noise" of lesser-powered devices turning on and off at a site. Therefore, ESDs are implemented to provide charging power to the EVs for short periods of time and then the ESDs are recharged from the electrical grid at a slower rate, thereby keeping short-term demand-averaged consumption lower than it would be if the EVs were charged directly from the grid. In these and other demand charge management settings, energy storage devices are exposed to low temperatures in large numbers. For example, when batteries are used as the energy storage devices for a demand charge management device, the large number of cells, large enclosures, and other equipment needed can force the user to store the batteries outside. Unfortunately, battery chemistries in today's electric vehicles (EVs) and commercial energy storage systems are often sensitive to the cold and may even become fire hazards if they are quickly charged or discharged at low temperatures.

Batteries and electronic hardware generate heat when they are being used due to the inherent exothermic properties of the systems. For example, typical energy efficiency for a round trip discharge-recharge cycle of a lithium-ion battery is about 97%, so approximately 3% of the energy used is turned into heat. However, energy storage systems such as batteries that are used for demand charge management may undergo extended periods of inactivity, during which time they are not generating heat. Existing technology uses heaters such as space heaters or a heat transfer medium to keep the energy storage devices' temperatures from dropping to dangerous levels, but they are an inefficient use of space in the tight enclosures, generate too much waste heat, and are counterproductive in demand charge management installations where electrical demand on the grid must be minimized. Additionally, use of space heaters drives up daily electricity usage and peak electricity usage, which can be counterproductive to the goals for which peak mitigation energy storage devices are installed in the first place.

BRIEF SUMMARY

The invention is directed to methods and systems of managing the charging and discharging of energy storage devices (ESDs). Many desirable embodiments of the invention take advantage of the heat generated by the charging and discharging of ESDs to raise the internal battery temperature in a controlled manner that balances charging and discharging during demand-averaged periods so as to minimize electrical demand charges that would result from the heating.

In some embodiments, heat is generated to raise the temperature of an ESD by charging or discharging the ESD via a connection to the local electrical utility distribution grid when the temperature of the ESD reaches a threshold value. The charging and discharging of the ESD is completed with reference to the timing of the demand-averaged period in which the heating takes place so that there is a balance of charging and discharging of the ESD that has an approximately zero net result (or a peak demand-reducing net result, in some embodiments) on the average demand for that demand-averaged period.

In some embodiments, a balance of charging and discharging maintains the state of charge of the ESD, keeping it from falling below a predefined level over time. In these embodiments, there may be a provision that allows charging or discharging to take place disproportionately to manage the state of charge of the ESD while managing the temperature, wherein the disproportionate activity is conducted in light of keeping the demand charge level for that billing cycle from being adversely affected as a result. In some embodiments a disproportionate charging and discharging pattern allows the state of charge to rise in anticipation of a need for energy during peak periods and allows the state of charge to fall in response to the need for demand response during peak periods. Similarly, in some embodiments the ESD is preheated in anticipation of a peak period by using the charge-discharge methods so that such heating will not be needed during the peak period.

In some embodiments, the ESD is heated by charging more than by discharging during periods when the energy consumption of the site is sufficiently below the current billing period's maximum demand average, and it is discharged more than it is charged when the consumption of the site is near or above the maximum demand average. This may keep a new maximum from forming due to the charging imbalance.

Patterns of charging and discharging may be used to manage the heat generation and demand management processes at work in embodiments of the invention. In some embodiments, the charging and discharging of the ESD is performed at equal magnitudes, but in other embodiments the charging is performed at a higher power level or for a longer duration than the discharging of the ESD in order to make up for losses that appear due to heat in the discharge-recharge round trip cycle. This may keep the state of charge of the battery from gradually decreasing over many demand-averaged periods. In some embodiments, the power levels during charging and discharging are based on the system's need for heat. As the rate of temperature drop in the battery increases, the rate of ESD charging or discharging increases to generate more heat in response. Likewise, if the rate of temperature drop slows, the charging and discharging rates may decrease accordingly.

In some embodiments, the pattern of charge and discharge of the ESD is determined by the point in a demand-averaged period of time in which an ESD temperature reaches a threshold temperature. In yet other embodiments the behavior of charge and discharge is dependent on whether the temperature rises above a predetermined value while the ESD is charging or discharging. In yet other embodiments the method of charge or discharge is determined by whether the distribution grid or another ESD charges the ESD.

In yet other embodiments the ESD discharges at a greater magnitude, but shorter duration, than it charges. This minimizes the effect of charging on the peak demand of the site while still providing heat to the ESD. It also minimizes the vulnerability of the system at the beginning or end of a demand-averaged period wherein a charge-discharge cycle can partially overlap two such periods and result in an unbalanced contribution to the average demand that results from the heating of the ESD. In yet other embodiments, the length of the charge-discharge cycles varies based on the amount of time that the heating lasts.

In some embodiments, the temperature of the ESDs is measured within each individual ESD of an array of ESDs. In other embodiments, the temperature is measured on or in the ambient area external to the ESDs. In these embodiments, the charge-discharge rates and timings may be managed using a correlative function based on historical conditions that relate the ambient temperature to the temperature of the ESDs. In yet further embodiments, measurements are taken of other properties of the ESDs, such as voltage or internal resistance, and these values are correlated to the temperature of the ESD to determine whether the ESD needs to be heated.

In some embodiments, a controller exchanges energy flow between the ESD and another separate device, such as another type of ESD or another ESD within an array of ESDs to which both ESDs belong. In these embodiments, the energy discharged from one ESD is used to charge the other ESD, thereby heating both ESDs simultaneously. In some embodiments, this transfer of energy between ESDs is supplemented by the distribution grid or another energy source to maintain the state of charge of the ESDs while they generate heat.

In yet other embodiments, a controller manages energy flow between an ESD and the grid in connection with the curtailment of a curtailable or sheddable load. In this case the ESD discharges when the curtailable load is consuming energy and the ESD recharges from the grid while the curtailable load is shed, thereby negating at least a portion of the ESD's demand on the grid.

In some other embodiments an upper limit temperature measurement is used to cut off charging or discharging of the ESD.

Additional and alternative features, advantages, and embodiments of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In addition to the novel features and advantages mentioned above, other objects and advantages of the present invention will be readily apparent from the following descriptions of the drawings and exemplary embodiments.

FIG. 1A is a graph showing the temperature over time of the ESD in an unmodified system and in a system modified according to two different exemplary embodiments of the invention.

FIG. 1B is a graph showing the charge or discharge power provided to or drawn from the ESD over time to create the modified temperature paths of FIG. 1A.

DETAILED DESCRIPTION

General Information

Typical embodiments of the invention are directed to a method and system for controlling the temperature of energy storage devices (ESDs) by generating heat through charging and discharging them during demand-averaged periods. Preferred embodiments of the system may serve to keep an ESD at a safe temperature without increasing demand charges. These and other features and advantages of embodiments of the invention will now be described in detail.

Figure 1:
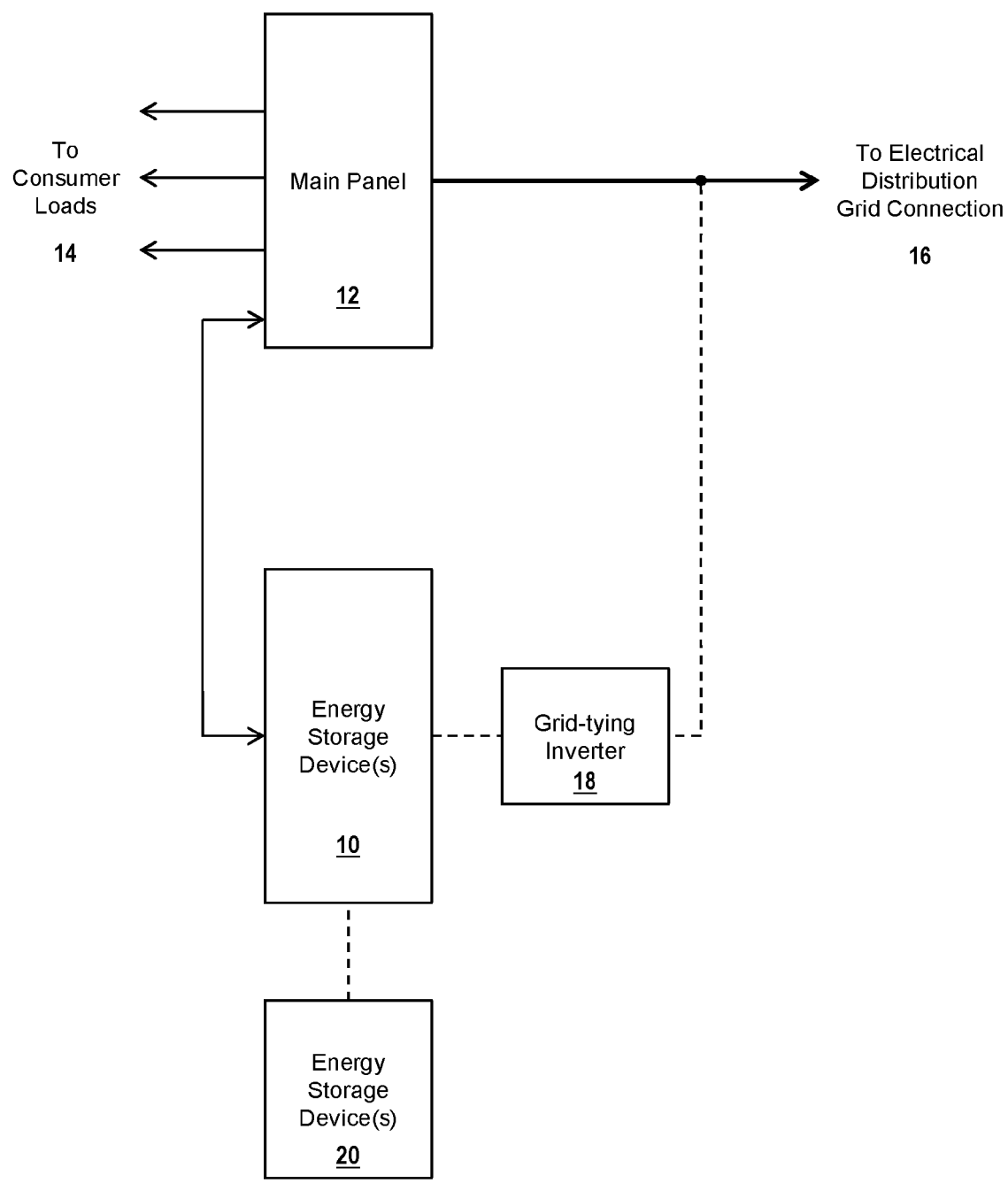
FIG. 1 is a block diagram showing connections between an ESD and other electrical elements at a site according to embodiments of the invention.

Some embodiments manage the temperature of an ESD by discharging the ESD to a connection to the local electrical utility distribution grid, and by charging the ESD using the same connection to the distribution grid. As shown in the embodiment of FIG. 1, an ESD 10 is connected to the electrical system of the site, such as through the main panel 12 at the site to which other loads 14 are connected, and thereby can receive power for charging, or send power while discharging, to an electrical distribution grid connection 16 for the site. A power converter may also be used to connect ESDs 10 to the panel 12 (e.g., a DC/AC inverter for DC-based ESDs). In other embodiments the ESD 10 has the capability of charging and discharging directly to the grid 16 through a power converter such as a grid-tying inverter 18. This alternative embodiment is shown with dashed line connections. In yet other embodiments, the ESD 10 is capable of charging or discharging to another energy storage device 20. Power converters may be used in any of these cases, as needed. The charging and discharging of the ESD 10 is maintained by a controller capable of changing the status of the ESD 10 between charging and discharging and is capable of monitoring the temperature of the ESD 10 or other ambient areas, depending on the configuration of the embodiment. In some exemplary cases the controller is a computer, analog or digital control circuit, or other similar device capable of reading the temperature of the ESDs and controlling a charge or discharge event. In the event that the controller is a computer or other electronic device or circuit, the processes and patterns that are part of the embodiments disclosed herein may be stored or embodied as executable code in a computer readable medium and configured to cause the controller to configure operational parameters of these methods.

The ESD 10 or 20 may be comprised of batteries, capacitors, another energy storage means used in demand charge management, or combinations or multiples thereof. In some embodiments the ESDs have a risk of damaging themselves or other systems if they are used or stored at low temperatures. "Low" temperatures in these cases are determined in reference to the characteristics of the ESDs in question. A lithium-ion battery, for example, can be dangerous to charge or discharge at high power when its temperature is below freezing, so temperatures approaching 32 degrees Fahrenheit would be considered "low," but the same temperatures may not be considered "low" to a compressed air tank-based ESD with no increased risk while at freezing temperatures. A "low" temperature may also be indirectly related to the composition or inherent characteristics of the ESD itself, such as the temperature range in which excess condensation begins to accumulate on the ESD and results in an increased risk of shock or fire if the ESD is used.

In this document, a "demand-averaged period" refers to a period of time having a definite length (e.g., 15 minutes) and starting and ending boundaries, over which period the demand (i.e., electrical load) on an electrical utility distribution grid is averaged for purposes of determining a demand charge for a billing cycle within which the demand-average period exists. For example, a demand-averaged period may be a time period wherein an electrical utility meter measures the energy drawn from the grid and finds the average value of that period. An electrical utility billing cycle includes a number of demand-averaged periods (e.g., it may last 30 days compared to 15-minute demand-averaged periods), and the demand charge for usage of energy from the distribution grid is determined based on the maximum demand average recorded from all demand-averaged periods in the billing cycle.

General Charge/Discharge Heating Patterns

FIG. 1A is a graph 100 showing an example of the unmodified temperature 102 an ESD over time according to some embodiments, as shown by the long-dashed line. The unmodified temperature 102 of these embodiments decreases at a steady rate of one degree per minute over the time period shown in the graph 100. For the purposes of these embodiments, the temperature 102 shown is the temperature measured within the ESD. In some embodiments the temperature may be measured elsewhere, such as, for example, on the surface of the ESD, in or on a housing containing the ESD, the ambient area, the atmospheric temperature in that locale, or at any other place that may feasibly correlate to the temperature within the ESD or that may be used to forecast the temperature that the interior of the ESD will experience at some point. For example, it may be determined that the temperature of the surface of the ESD housing follows a function of the temperature of the interior of the ESD (or vice versa), and in that case, the ESD housing temperature may be used by the controller in determining whether the ESD within the housing needs to be heated. In some embodiments, the temperature of the ESD needs to be forecast over the next demand-averaged period or beyond, and in these cases a database of historical temperatures of the ESD itself, the ambient area of the ESD, the weather of the ESD's location, and other like indicators may be used in calculating the forecast. In yet further embodiments, the temperature of the ESD is correlated to other measurements taken at the site, such as the voltage or current coming from a part of the ESD, and the ESD temperature is deduced or inferred from these values.

For purposes of the embodiments shown in the figures, a threshold temperature 104 is set at 34 degrees, as indicated by the short-dashed horizontal line 104. The threshold temperature 104 is the temperature at which the controller begins discharging or charging the ESD to generate heat if the temperature of the ESD 102 reaches the threshold 104. The threshold temperature 104 such as this is selected based on criteria such as the low temperature risk range for the ESDs that need protection and the rate of response of the temperature control commands. For example, in this embodiment, if it is assumed that 32 degrees is the temperature at which ESD operation begins to be too risky, the threshold temperature 104 is set a few degrees higher than 32 degrees to provide a safety margin and to allow the system to have some time to react before the ESD temperature reaches 32 degrees, if needed. The specific values for the threshold temperature 104 and the risk temperature in this embodiment are included for illustration purposes only, and should not be construed as limiting values. In some embodiments, the ESD is more dangerous to charge at certain temperatures than it is to discharge at those temperatures. For example, for a given level of current, a lithium-ion battery may be able to safely discharge at temperatures lower than it can safely charge. In these embodiments, an additional threshold temperature may be used that is lower than the threshold temperature 104 wherein the ESD is prevented from charging (or discharging, if the ESD properties so dictate) when the ESD temperature falls below the additional threshold temperature.

FIG. 1A also shows two lines representing the temperature of the ESD under two different temperature management methods. The solid line 106 represents an approximately equal charge-discharge pattern, and the dashed line 108 represents a demand charge-optimized charge-discharge pattern, as will be discussed in connection with FIG. 1B.

FIG. 1B shows the charge and discharge power level that the ESD (the temperature of which is graphed in FIG. 1A) experiences over time. In this chart, negative values indicate discharging and positive values indicate charging the ESD. The solid line 110 represents an approximately equal charge-discharge pattern, and the dashed line 112 represents a demand ceiling-optimized charge-discharge pattern.

For example purposes, in the embodiments of FIGS. 1A and 1B the time period within which the load is averaged for demand charge calculation (i.e., the demand-averaged period) is twelve minutes. During the first twelve minutes of the period shown, the temperature of the ESD 102 is above the threshold temperature 104, and the controller does not engage any temperature management charging or discharging, as shown in the first twelve minutes of FIG. 1B. At the twelfth minute, the unmodified temperature 102 is measured crossing the threshold temperature 104. At this point the equal charge-discharge pattern (106 and 110) and the demand ceiling-optimized pattern (108 and 112) diverge. The equal charge-discharge pattern 106 charges and discharges the ESD to keep its temperature from falling below the threshold temperature 104. As shown by line 110, the ESD is charged and discharged at the same magnitude, and the charging and discharging is equally distributed over the twelve-minute period ending at minute twenty-four. In this embodiment, the ESD is discharged before it is charged because it is assumed that the ESD is maintained at full charge during the first twelve minutes, and therefore if the first command from the controller was to charge the ESD, it would not generate the heat desired because the ESD would be unable to charge any further. In other embodiments, the ESD may be maintained at a lower state of charge, so charging may take place first. In yet further embodiments the ESD may be unable to charge or the user may not wish to charge the ESD, and the primary purpose of the temperature management methods is to only discharge the ESD and thereby generate heat to raise its temperature.

In some embodiments the power level of the ESD charge or discharge periods is adjustably higher or lower in order to generate more or less heat over time. In the embodiment of pattern 110 the magnitude of power level remains the same across the entire twelve- to twenty-four-minute demand-averaged period because the temperature of the ESD 102 is falling at a constant rate, so a constant-magnitude discharge and charge rate, at a sufficient power level to counteract the temperature shift, will keep the temperature of the ESD steady at the threshold temperature value 104, as shown by line 106 for the entire demand-averaged period in question. The constant magnitude of the pattern 110 also assumes that the temperature of the ESD changes at the same rate whether it is charging or discharging. The power level of charging or discharging may be adjusted higher or lower in order to generate more heat due to a rapidly falling ESD temperature or due to time constraints in the demand-averaged period.

In some embodiments, the length of time spent charging is not equal to the length of time spent discharging. If the charging time is longer than the discharging time, this allows the ESD to recharge over time and thereby maintain a state of charge that is useful for other purposes such as demand charge management. In some embodiments there are losses in the system that mandate slightly more charging than discharging or else the ESD will gradually lose its charge over time. Likewise, modifications may need to be made for situations when the ESD is low on charge (e.g., right after a demand charge management discharge) so that more charging takes place than discharging in order to bring the state of charge of the ESD back to a normal level. Disproportionate charging and discharging patterns are discussed in further detail in connection with FIG. 4.

The effect on the demand charge is also considered in determining the duration and magnitude of the charge and discharge periods of pattern 110. The demand charge calculation periods in FIGS. 1A and 1B span twelve minutes each, starting at time zero. During those twelve minute spans, the electrical utility company will create an average value of the overall consumption of the site to which the ESD is connected, and the highest of those average values that are generated over a billing cycle will be used to calculate the demand charge for the site. Therefore, to make the most efficient use of the temperature controller, the effect on the average demand charge for the site should optimally be zero or negative over each demand-averaged span of time during the billing cycles. By discharging the ESD into the grid during the demand-averaged periods, the average demand for those periods is decreased, but because the ESD will most likely have to be charged as well, and energy is thereby consumed, the charging will also drive the average demand back upward. Therefore, balancing the duration and power level of the charging and discharging periods over each demand-averaged period will have a net zero effect on the average demand for the site.

Charge-discharge pattern 110 shows an example of a balanced charge and discharge sequence that will have an approximately zero net effect on the demand charge calculation for the site. During the twelve-minute to the twenty-four-minute mark, half of the time is spent discharging and half of the time is spent charging the ESD, and charging and discharging is completed at equal magnitudes, so the average power contribution of the temperature management process to the overall average demand at the site for that demand-averaged period is zero. Due to losses inherent in the discharging and charging process, however, if pattern 110 is followed precisely as pictured, the ESD will lose charge over time and will not be able to sustain the temperature control method indefinitely. This may be remedied by determining the inefficiency of that ESD (e.g., determining that 3.5% of charge is lost during an equal-magnitude, equal-time charge-discharge pattern), and accounting for it by adjusting the total energy charged during the demand-averaged period to restore the inefficiency losses to the ESD while keeping the average of the power level of charging and discharging at zero or negative over each demand-averaged period. In some embodiments, the ESD is able to recharge these losses from an energy source separate from the distribution grid, such as a photovoltaic or wind generator, in which case the charge and discharge periods may in fact have equal magnitudes and time durations.

In some situations, the overall demand at the site approaches the maximum rated capacity of the electrical grid connection at the site. For example, a circuit breaker panel may have a maximum kilowatt rating that the site frequently approaches when an EV charger is in use. If the maximum capacity is reached or exceeded, the electrical system at the site can be unstable or dangerous to use, and charging the ESD at a high power level can contribute to faults in the electrical system or overheating vital electronics. The demand ceiling optimized pattern 112 is another charge-discharge method embodiment that may be beneficial to use in these situations.

The magnitude of the charging portion of a discharge-recharge pattern is the part of the pattern that contributes to exceeding the rated consumption of a site, so embodiments typified by pattern 112 minimize the power level at which the ESD is charged. There are two considerations that must be kept in mind when this embodiment is implemented: first, the averaged demand of the ESD heating activity should still be kept optimally at zero or a negative value, and second, the charging power must be sufficient to generate enough heat to keep the ESD temperature 108 above the threshold temperature 104. To keep the average demand low, the ESD is discharged at higher power than the charging power and is discharged for less time than the charging period, as illustrated by pattern 112. The low power charging portion of the pattern 112 ensures that the heating of the ESD has a minimal effect on the overall instantaneous demand on the distribution grid for that site. The high-power discharge portion generates heat in the ESD more quickly than the low-power charging portion of the pattern 112, as shown by the dashed line representing the ESD temperature 108 that rises quickly while the ESD is discharged. In this embodiment, the power levels of the discharge and charge portions of pattern 112 are selected in a manner that balances the need to minimize the charging power while still providing enough heat to the ESD during charging to keep the ESD temperature 108 higher than the threshold temperature 104, as shown by the ESD temperature 108 from minute twelve to minute twenty-four and beyond. In this embodiment the ESD temperature 108 rises for the first two minutes, then falls off again to approximately the threshold temperature 104 over the next ten minutes (although at a slower pace than if no charging were taking place, as seen by the less-negative slope of the temperature 108 during the charging period when compared to the slope of the unmodified temperature 102 during that period). The magnitude of the charge and discharge portions of the pattern 112 may also need to be set to ensure that the state of charge of the ESD is replenished after each discharging period, as discussed in connection with other embodiments herein.

The use of patterns similar to pattern 112 requires that the ESD is capable of discharging at a greater power level than it charges. If the ESD is connected to the grid, it may need a highly-rated grid-tying inverter to do so.

Some embodiments are variations on exemplary patterns 110 and 112. For example, if the ESD is low on charge when it needs to have its temperature managed, the magnitude or duration of discharging may be lessened in favor of charging the ESD for a longer period of time in a manner consistent with keeping average demand caused by this process low.

In some embodiments, the controller keeps track of the maximum averaged demand values for previous demand-averaged periods of the current billing cycle (whether or not the ESD was being heated at those times). In these embodiments, the controller detects whether the maximum averaged demand of the previous demand-averaged periods (or the projected averaged demand of a future demand-averaged period) is higher than the projected demand for the current demand-averaged period. This gap between the maximum averaged demand from another demand-averaged period and the projected demand for the current demand-averaged period may be referred to as the "headroom" available to the system. When there is headroom available, the controller may allow the average of the demand resulting from heating the ESD to be significantly greater than zero, up to raising the overall average demand of the site during the current demand-averaged period to the previous maximum averaged demand.

In other embodiments, the ESD is allowed to be heated even if it causes the demand charge to increase, such as in cases where the potential damage to the ESD due to low temperatures would be more expensive to address than paying an increased demand charge for that billing cycle.

Threshold Timing Heating Pattern Modifications

Figure 2A:
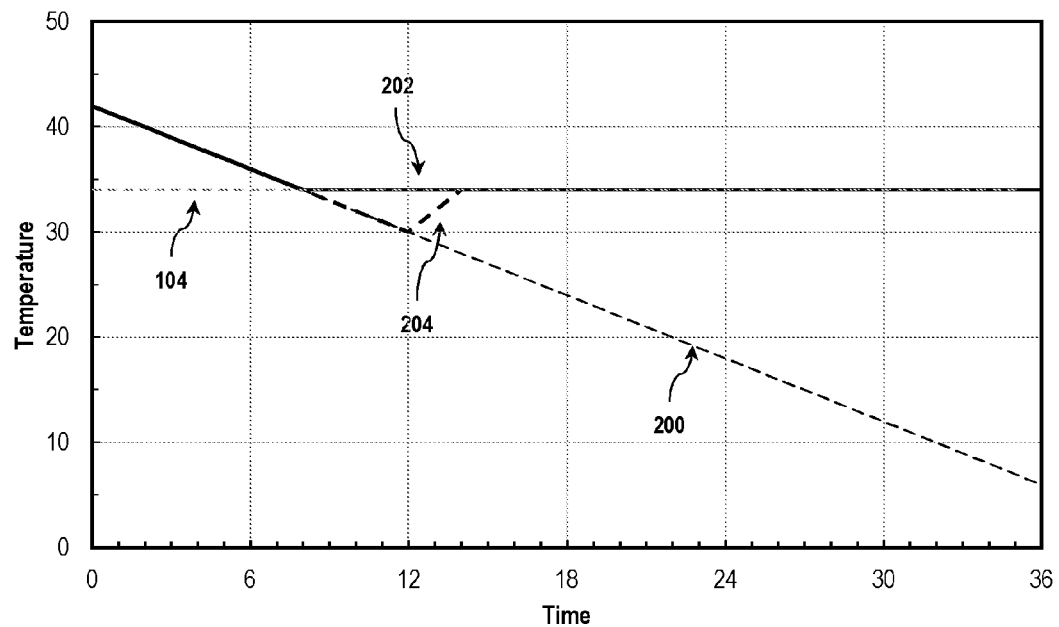
FIG. 2A is a graph showing the temperature over time of the ESD in an unmodified system and in a system modified according to two different exemplary embodiments of the invention.
Figure 2B:
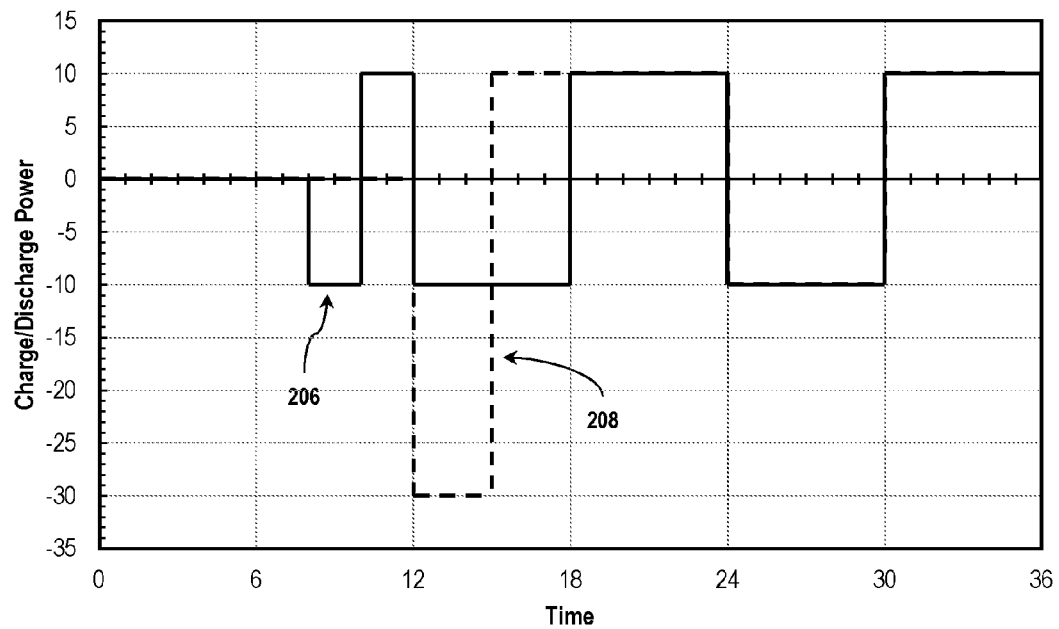
FIG. 2B is a graph showing the charge or discharge power provided to or drawn from the ESD over time to create the modified temperature paths of FIG. 2A

FIG. 2A shows graphs of the unmodified temperature of an ESD 200 over time and the modified temperatures of the ESD over time 202 and 204 as modified by two additional charge-discharge patterns 206 and 208 shown in FIG. 2B. In these embodiments, the unmodified temperature crosses the temperature threshold 104 at the eight minute mark, a time that is in not at the beginning of a demand-averaged period. This can cause at least two different potential problems: (a) if the ESD is heated by charging during that period, it will drive up the overall demand average for the site for that period, and (b) if no heating takes place, the ESD temperature may continue to drop, increasing the risk of damage to the ESD and associated devices. Discharge patterns 206 and 208 are exemplary ways that the temperature management controller can react in this situation.

Charge-discharge pattern 206 has equal-magnitude charging and discharging similar to pattern 110, but instead of spreading the discharging and charging across the entire demand-averaged period, the controller spreads discharging and charging across only the time remaining in the current demand-averaged period. For example, when the temperature of the ESD 202 reaches the threshold temperature 104 at the eight minute mark, the controller determines the time remaining until the twelve-minute mark and allocates charging and discharging at roughly equal magnitudes for the remaining time. In this illustration, there are four minutes remaining before a new demand-averaged period (which new period would span the twelve-to-twenty-four minute period of time), so pattern 206 discharges the ESD for two minutes from minute eight to minute ten, then charges the ESD from minute ten to minute twelve. Once the next demand-averaged period begins at minute twelve, if heating is still required, the controller continues with an equal-magnitude pattern of half-discharging and half-charging through the next demand-averaged period. The pattern is then extended from minute twenty-four to minute thirty-six. This pattern 206 is suitable for keeping the ESD from dropping below the threshold temperature 104 at all times without needing a highly rated inverter or other means to allow the ESD to discharge or charge at high rates, since both rates have equal magnitudes.

Charge-discharge pattern 208 delays heating the ESD until the next demand-averaged period begins. Here, the ESD temperature 204 crosses the threshold temperature 104 at the same time as ESD temperature 202, but instead of taking immediate action, the controller waits until the start of a new demand-averaged period (i.e., the twelve minute mark) to begin generating heat through charging or discharging. This allows the ESD temperature 204 to potentially continue dropping below the threshold temperature 104 in the meantime, but once the new demand-averaged period is reached, the controller discharges the ESD at a heightened power level that allows the temperature of the ESD 204 to return to the temperature threshold 104 once the next demand-averaged period begins. The ESD is charged for the time remaining in that demand-averaged period, which in this illustration spans from minute fifteen to minute twenty-four, at a rate that allows the average demand due to heating the ESD during that period to be zero or negative. This rate may need to be higher or lower than an equal-magnitude pattern's charging period, depending on the magnitude and duration of the discharging period. After the demand-averaged period ends, the controller may then return to a balanced charge-discharge pattern that keeps the temperature 202 at the threshold temperature 104, which in this illustration spans minute twenty-four to minute thirty-six.

Charge-discharge pattern 208 may be useful in that it allows the user to reduce the number of charge and discharge events required from the ESD, which can wear down the ESD over its lifetime, but it should be used with caution since the change in the unmodified temperature 200 may allow the ESD temperature 204 to drop for too long. Therefore, in some embodiments, the controller references historical and other data related to the temperature of the ESD to project whether the temperature 200 will drop too far before action is taken at the start of a new demand-averaged period. In other embodiments, this data is part considered when the temperature threshold 104 is set so that the temperature is unable to or very unlikely to be able to fall to a dangerous level before a new demand-averaged period begins. In yet further embodiments, the controller follows conditional rules that may be a combination of pattern 206 and pattern 208, wherein if the temperature falls below the threshold temperature 104, the controller takes no action and waits for the temperature to cross another lower threshold temperature or waits for the rate of temperature fall-off to reach a critical threshold value, at which time the controller allows charge and discharge as required to avoid damage or dangerous conditions at the ESDs. In yet other embodiments the controller only permits the ESD temperature 204 to go without heating for a limited time period or until it reaches a predetermined second threshold temperature before forcing heating procedures to start. For example, the controller may only delay charging or discharging if less than half of the total time in the demand-averaged period remains, and if more than that amount of time remains when the ESD temperature 204 reaches the threshold temperature 104, charging or discharging begins immediately.

Figure 2C:
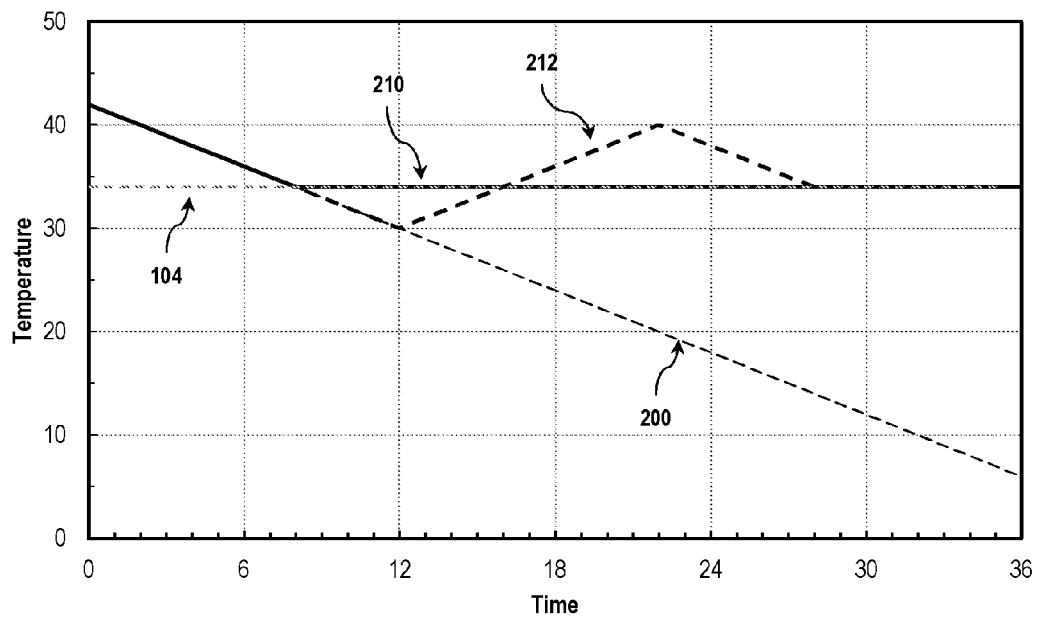
FIG. 2C is a graph showing the temperature over time of the ESD in an unmodified system and in a system modified according to two different exemplary embodiments of the invention.
Figure 2D:
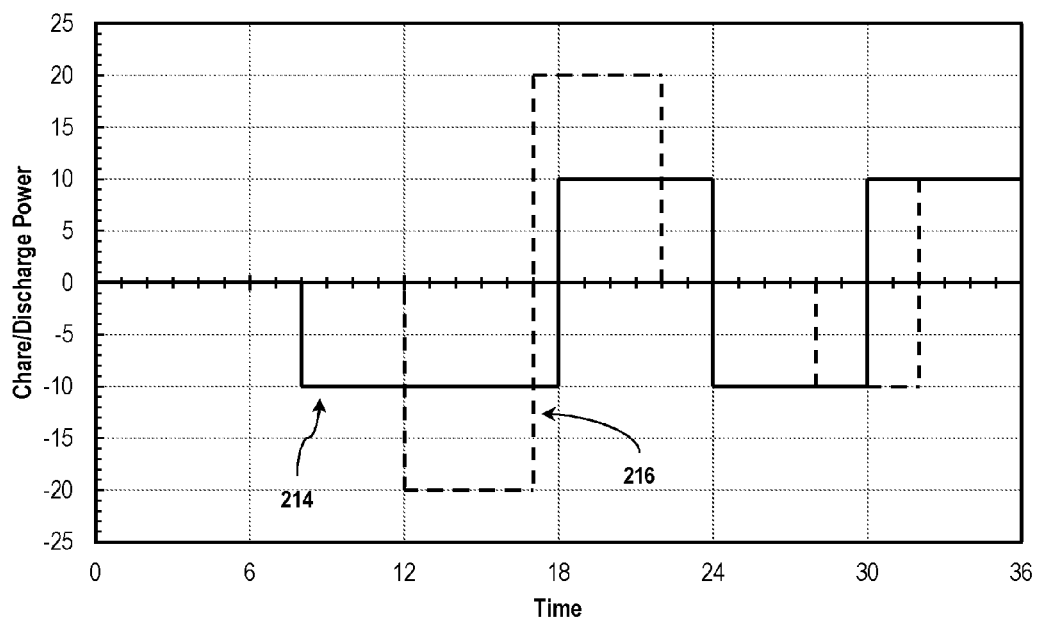
FIG. 2D is a graph showing the charge or discharge power provided to or drawn from the ESD over time to create the modified temperature paths of FIG. 2C.

FIGS. 2C and 2D are related to FIGS. 2A and 2B in that they both show embodiments of a temperature management method that may be produced when the unmodified temperature falls below the threshold temperature at some point in the middle of a demand-averaged period. In these graphs, line 210 represents the temperature of the ESD when the temperature is managed by charge-discharge pattern 214, and line 212 represents the temperature of the ESD resulting from pattern 216.

When following pattern 214, the controller discharges the ESD from the time the ESD temperature 200 reaches the threshold temperature 104 until the start of a new demand-averaged period, as shown by the discharge period of pattern 214 from minute eight to minute twelve. After reaching a new demand-averaged period, the controller may switch to another pattern, such as the equal charge and discharge pattern shown for pattern 214 from minute twelve to minute thirty-six. This pattern 214 is conservative in that discharging the ESD does not have a negative impact on the demand average used to calculate a demand charge for the first demand-averaged period and the temperature of the ESD is maintained at the threshold value during that time so there is less risk of the ESD reaching a dangerous low temperature. This pattern 214 drives down the state of charge of the ESD initially, however, and it may however require that demand-averaged periods that follow the first period, such as the period from minute twelve to minute twenty-four, to charge the ESD more than normal.

Under pattern 216, heating actions are delayed from the time the temperature of the ESD 212 reaches the threshold temperature 104 until a new demand-averaged period begins. At that time, the ESD is discharged at high power to quickly bring the temperature of the ESD 212 back to the threshold temperature 104. At that point, the ESD is quickly charged (e.g., from minute seventeen to minute twenty-two on pattern 216) until the state of charge of the ESD is back up again. In embodiments where this type of quick-charging is used, the time remaining in the demand-averaged period is taken into account so that the averaged demand resulting from the heating process is approximately zero. These embodiments allow the ESD to stay at full charge for longer than embodiments like pattern 208 since the ESD recharged after the discharge in a relatively short period of time. During the time from minute twenty-two to minute twenty-four, the pattern 216 has no charge or discharge because the ESD is at full charge and the temperature of the ESD 212 is above the threshold temperature 104. At minute twenty-eight, the temperature 212 reaches the threshold temperature 104 again, and charging and discharging are dispersed equally across the time remaining in that demand-averaged period in order to keep the temperature at the threshold temperature 104 and the state of charge of the ESD near full. Note that the behavior of the controller in the final demand-averaged period of pattern 216 is comparable to the behavior of the controller in the first demand-averaged period of pattern 206.

Variable Temperature Rate Heating Pattern Modifications

Figure 3A:
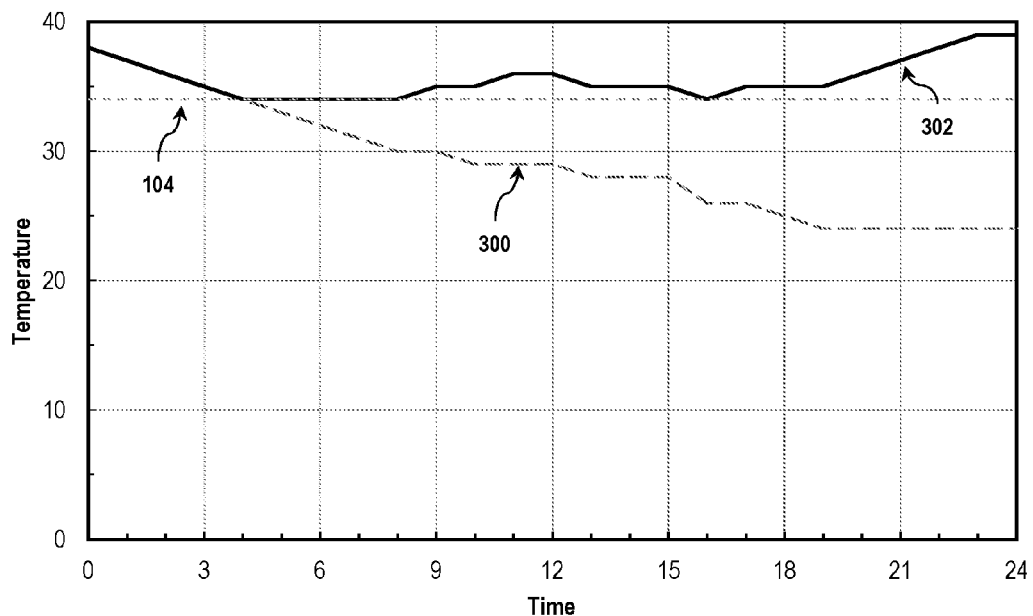
FIG. 3A is a graph showing the temperature over time of the ESD in an unmodified system wherein the temperature does not drop at a constant rate and a corresponding modified system according to an exemplary embodiment of the invention.
Figure 3B:
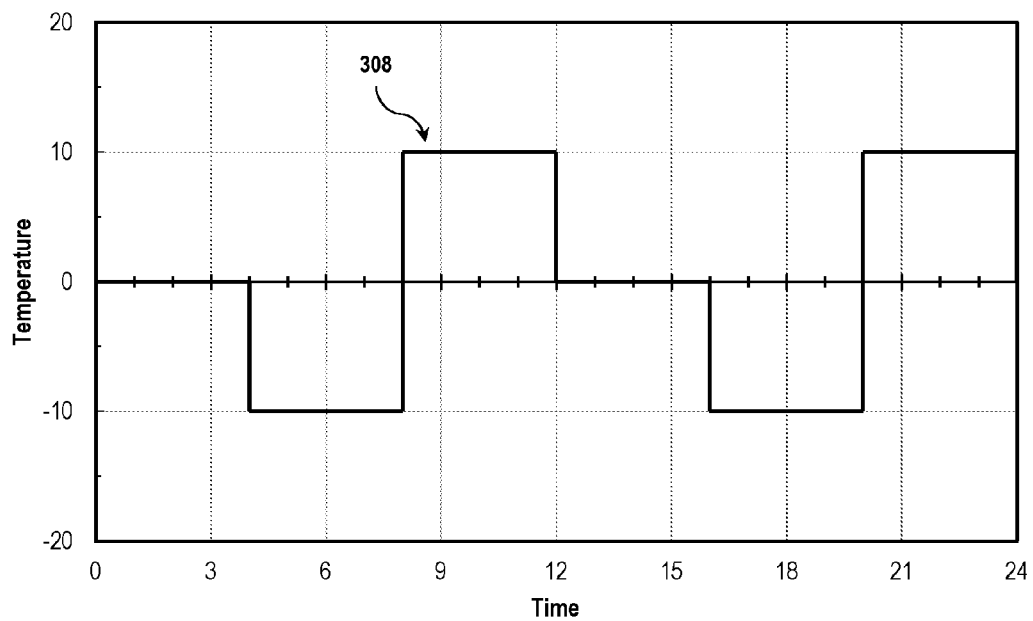
FIG. 3B is a graph showing the charge or discharge power provided to or drawn from the ESD over time to create the modified temperature path of FIG. 3A.
Figure 3C:
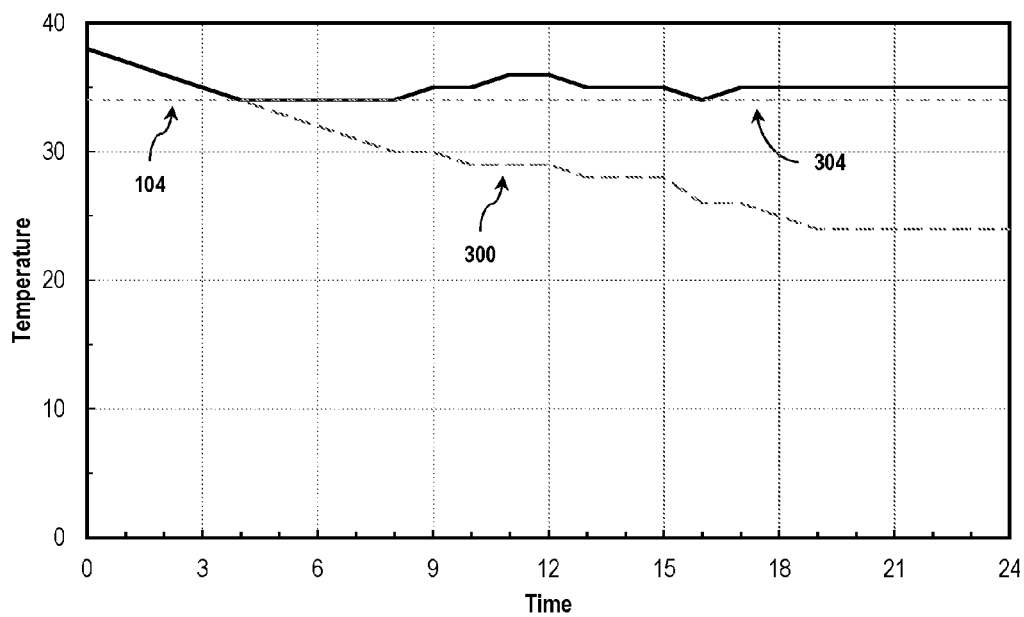
FIG. 3C is a graph showing the temperature over time of the ESD in an unmodified system wherein the temperature does not drop at a constant rate and a corresponding modified system according to an exemplary embodiment of the invention.
Figure 3D:
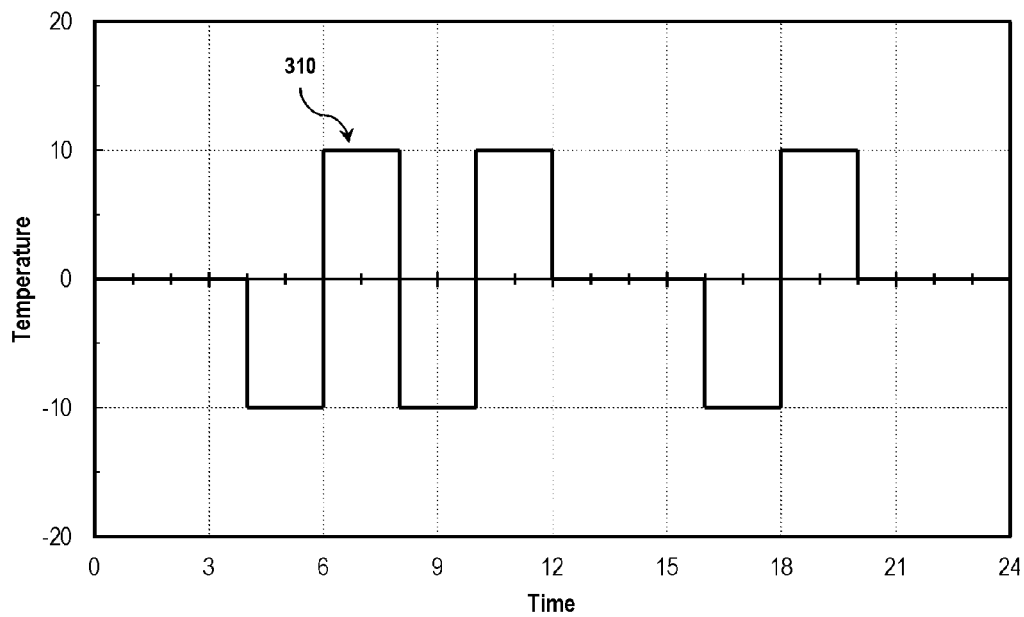
FIG. 3D is a graph showing the charge or discharge power provided to or drawn from the ESD over time to create the modified temperature path of FIG. 3C.
Figure 3E:
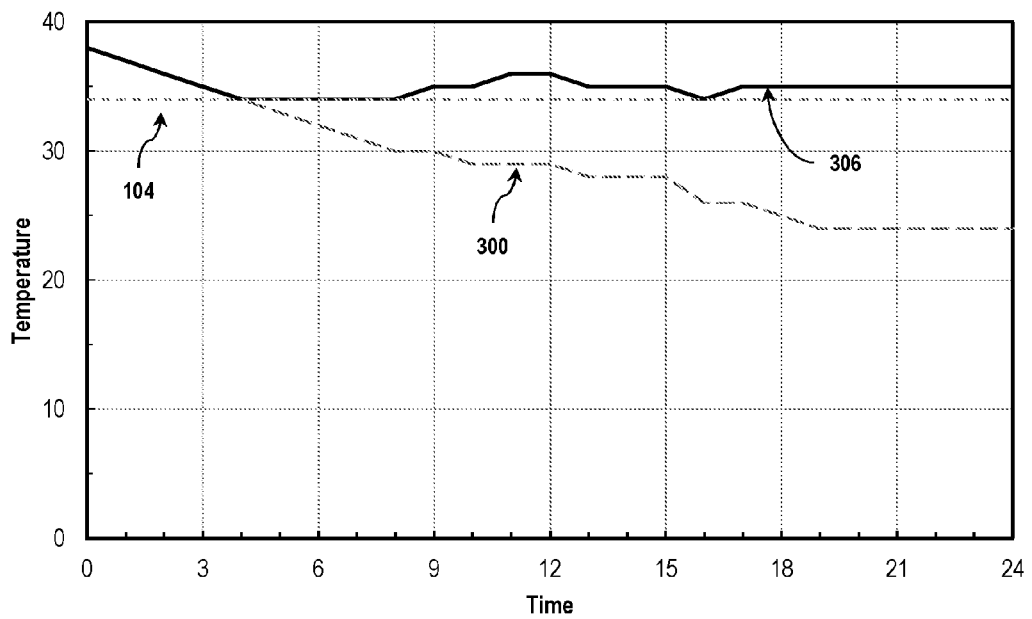
FIG. 3E is a graph showing the temperature over time of the ESD in an unmodified system wherein the temperature does not drop at a constant rate and a corresponding modified system according to an exemplary embodiment of the invention.
Figure 3F:
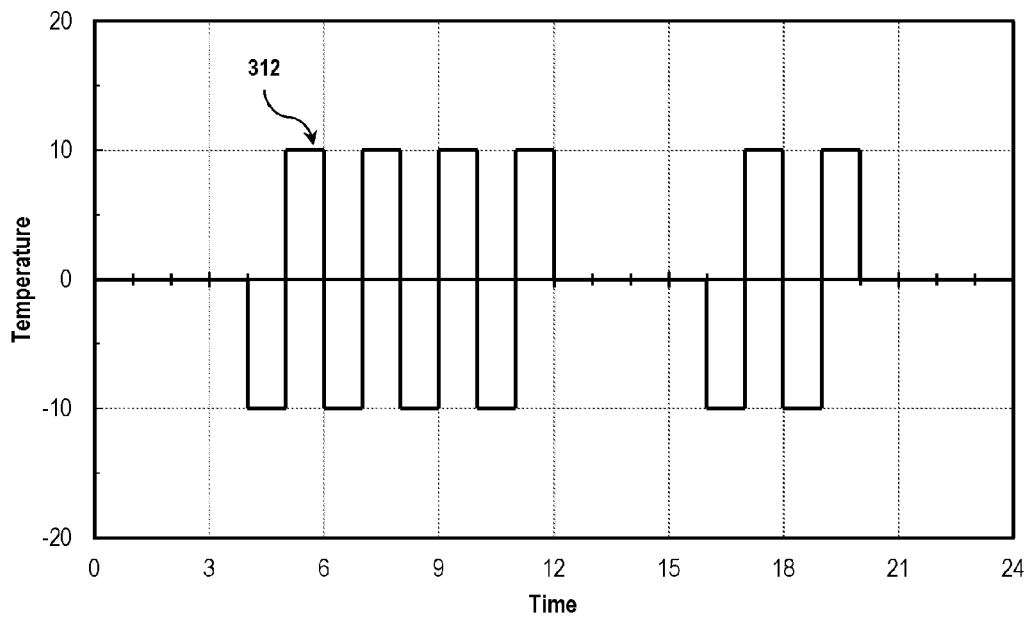
FIG. 3F is a graph showing the charge or discharge power provided to or drawn from the ESD over time to create the modified temperature path of FIG. 3C.

FIGS. 3A, 3C, and 3E are similar to previous embodiments in that they show the temperature of an ESD 302, 304, 306 over time as modified by respective charge-discharge power patterns 308, 310, and 312 shown in FIGS. 3B, 3D, and 3F. The unmodified temperature 300 charted in these figures does not steadily decrease as in previous figures, but instead falls irregularly across the various intervals over the time shown. As a result, these charge-discharge patterns 308, 310, and 312 do not necessarily need to cause charging or discharging perpetually from the first time the unmodified temperature 300 reaches the temperature threshold 104.

FIGS. 3A and 3B show a pattern 308 wherein once the temperature of the ESD 302 reaches the threshold temperature 104, the controller automatically discharges the ESD for half of the time remaining in the current demand-averaged period and then recharges the ESD for the other half of the time remaining. For example, as the ESD temperature 302 reaches the threshold temperature 104 at the four-minute mark, the controller determines that there are eight minutes remaining until the start of the next demand-averaged period, so there is a period of four minutes of discharge (until minute eight) and then four minutes of charge (until minute twelve). Likewise, when the ESD temperature 302 briefly reaches the threshold temperature 104 at minute sixteen, the controller discharges for half of the remaining demand-averaged period and charges for the other half.

FIGS. 3C and 3D show a pattern 310 wherein once the temperature of the ESD 304 reaches the threshold temperature 104, the controller determines how much time is remaining in the present demand-averaged period. If there is more than half of the time left in the demand-averaged period, the controller discharges until the halfway point is reached, then recharges for the amount of time that the discharging took place during the second half of the period. In some embodiments, the recharging period lasts until the end of the current demand-averaged period. In other embodiments, including pattern 310 shown in these figures, the recharging period does not last until the end, and after the first recharging period ends (e.g., at minute eight in these figures), the controller restarts the process, allowing discharging (as needed) for half of the remaining time in the demand-averaged period and then allowing charging to recoup the charge lost (as needed) during the last half of the remaining time, then possibly dividing the remaining time after that time again between discharging and charging. These embodiments may vary depending on the capacity or other characteristics of the ESD and the duration of the demand-averaged period for that particular embodiment. In some of these embodiments, the controller may cause a charge or discharge event during the remaining time of the demand-averaged period in order to maintain charge in the ESD and/or ensure that the overall average demand resulting from the pattern 310 is negative or near zero.

As shown in FIG. 3C, at the eight-minute mark the ESD temperature 304 is at the threshold temperature 104, so the controller allows discharging since at that point there is more than half of the remaining four minutes of the demand-averaged period left. After minute nine, the ESD temperature 304 is above the threshold 104, so the controller stops discharging. When there are two minutes left in the demand-averaged period (i.e., at the ten-minute mark), the controller determines that in order to keep the average demand at approximately zero and to preserve the state of charge of the ESD, the remaining minute is spent charging the ESD. By the twelve minute mark, the average demand resulting from the heating process is approximately zero, and the ESD has the same state of charge it started with at time zero.

At the twelve-minute mark, the controller waits for the temperature of the ESD 304 to reach the threshold temperature 104 again. In this case this temperature is reached at the sixteen-minute mark. Because the sixteen-minute mark is within the first half of the demand-averaged period spanning from the twelve-to-twenty-four minute period, the ESD is discharged. The controller stops discharging at minute eighteen since it is the end of the first half of that demand-averaged period, then recharges for two minutes (the length of time of the preceding discharge) in order to restore the state of charge of the ESD and to zero out the demand contribution in that period due to ESD temperature management. In some embodiments similar to this pattern 310, the discharging or charging takes place at a heightened power level to bring the ESD temperature 304 or the state of charge of the ESD into line within the time constraints of the demand-averaged period. Other modifications of previous embodiments may also be incorporated to pattern 310 in a similar fashion.

FIGS. 3E and 3F show a charge-discharge pattern 312 wherein once the temperature of the ESD 306 reaches the threshold temperature 104, the controller begins an alternating discharge-recharge pattern to keep the temperature of the ESD from falling any further. In this embodiment, for each interval of discharge, one interval of recharge immediately follows, whether or not the ESD temperature 306 is still at or below the threshold temperature 104. For example, the controller may detect that the ESD temperature has reached the threshold temperature, then discharge for one minute and immediately thereafter recharge for one minute. This method may result in excess heat generation if the ESD temperature 306 exceeds the threshold temperature 104 during the initial discharge of the alternating pattern, but it also keeps the ESD at a high level of charge on average over short periods of time. In some of these embodiments, if the controller would otherwise discharge the ESD for the entire final minute (leaving no time to recharge before the start of a new demand-averaged period), the controller may instead discharge for thirty seconds of the final minute and recharge for the final thirty seconds in order to keep the state of charge of the ESD full and the demand average of the demand-averaged period near zero. Other subdivisions of the demand-averaged period may be used in place of the illustrative one minute and thirty second divisions described herein.

In other alternating pattern embodiments, instead of requiring immediate recharge after each discharge period the controller alternates between discharging and charging over short periods, but only activates either action when it is necessary to (a) keep the ESD temperature 306 from dropping, (b) keep the demand average near zero, or (c) keep the ESD at a full state of charge. For example, in FIG. 3F, the charging and discharging activity that spans from minute nineteen to minute twenty on pattern 312 would not take place at that time, since the temperature of the ESD 306 at that time would be above the threshold temperature 104, but it may appear in the final minute of the demand-averaged period (i.e., from minute twenty-three to minute twenty-four) in order to keep the demand average at zero and the state of charge of the ESD at full for the second pictured demand-averaged period. In some embodiments the power level of the charge and discharge periods would need to be adjustable or greater than that shown in FIGS. 3E and 3F in order to prevent the ESD temperature 306 from falling below the threshold temperature 104.

In some embodiments, it may not be desirable to require the ESD to discharge and recharge as deeply or frequently as the patterns of the embodiments of FIGS. 3A and 3B. For example, it is inefficient to continue charging and discharging after the sixteen-minute mark of FIG. 3A since the ESD temperature 302 never reached the threshold temperature 104 again in that demand-averaged period even if no action was taken. For this reason, embodiments that would find these patterns advantageous would be in places where the unmodified temperature 300 is expected to descend below the threshold temperature 104 for extended periods of time. Furthermore, depending on the situation, these patterns may result in excessive increases in the ESD temperature 302 since heating takes place for potentially long portions of the demand-averaged period, as seen when comparing the final temperature of line 302 to the final temperatures of lines 304 and 306. However, in some embodiments this final increase in the ESD temperature 302 may be advantageous, since reducing the overall number of temperature management cycles needed in future demand-averaged periods may extend the lifespan of the ESD. These patterns could also be useful in systems where the ESD needs a relatively long time to warm up or to begin charging or discharging, since the controller may only need to discharge and charge once within each demand-averaged period.

In some embodiments, the controller is provided an upper limit temperature, wherein if the ESD temperature (e.g., 302) reaches the upper limit temperature, any heating activity is disabled to prevent the ESD temperature from rising any further. This may assist in preventing damage to the ESD due to excess temperature gains from heating leading to overheating of the ESD or its associated electronics. In these embodiments, discharging or recharging for other purposes, e.g., demand charge mitigation, may or may not be allowed by the controller depending on the capability of the ESD to withstand high temperatures and the significance of the need for the discharging or recharging for other purposes. Discharging or recharging for other purposes does not fall within the definition of "heating activities" for these embodiments, notwithstanding that the discharging or recharging may result in heat generation in the ESD.

The patterns of the embodiments described in connection with FIGS. 3E and 3F are advantageous in embodiments where the ESD has small energy storage capacity or when the ESD needs to be maintained at a high state of charge as much as possible. The short bursts of discharge and recharge in these patterns may reduce the required depth of discharge and the amount of energy provided by the ESD within any given demand-averaged period, and even if there is deep discharge over the short discharge periods, spent energy is immediately restored to the ESD thereafter. These embodiments may also be desirable when the ESD system can switch between charging and discharging relatively quickly, since it is required to do so at a relatively high rate.

The patterns described in conjunction with FIGS. 3C and 3D can be advantageous when the user needs to avoid heating the ESD very much above the threshold temperature, since the ESD temperature 304 in these embodiments tends to stay lower when these patterns are used when compared to other embodiments (e.g., pattern 308). Since the number of charge/discharge events in the patterns described along with FIGS. 3C and 3D is moderate, these patterns may also be useful for ESD systems that advantageously find a balance between patterns having a low number of discharge and charge events, like pattern 308, and patterns having a high number of discharge and charge events, like pattern 312.

Patterns for Uncertain Demand-Averaged Period Timing

In some embodiments, the start and end of the demand-averaged periods are unknown. When charge-discharge heating is performed under these circumstances, it is possible that the heating cycle will unevenly overlap two or more demand-averaged periods and will consequently charge more than it discharges in one or more of the demand-averaged periods. Excess charging drives up the average demand, so in these embodiments some modifications to the charge-discharge pattern may be advantageous to reduce the impact of this effect.

One possible modification is altering the duration of each charge and discharge pattern depending on the length of time that heating is needed. For example, when heating is likely to overlap two demand-averaged periods, the controller may shorten the length of all charge and discharge cycles, increasing their frequency. In some cases, such as when batteries are used as the ESD, the charge and discharge periods may be shortened to a length on the order of one or two minutes or whatever value that is near the maximum rate of switching between charge and discharge can be borne by the system. When all the charge and discharge patterns are brief, the effect on the demand average of one additional charging event in a demand-averaged period is drastically reduced and may even become negligible.

As an extension of this modification, in some embodiments the length of the charge and discharge periods may start at a normal duration and get shorter as time goes on or as the likelihood of overlapping demand-averaged periods increases. For example, if the heating is likely to last longer than the length of one demand-averaged period, the controller may set the final portion of the heating cycle that is as long as one demand-averaged period to use a shortened charge-discharge cycle since it is more likely that the final portion will overlap a boundary of demand-averaged periods. This modification may be preferable because it does not require the ESD to constantly need to cycle at high frequency, just when it is most likely to adversely impact the demand average.

In another embodiment, the controller may set the ESD to charge and discharge at shortened intervals for a preset time after the system no longer needs heating (e.g., ESD temperature is above the temperature threshold) to ensure that the shortened charge-discharge pattern overlaps a demand-averaged period boundary, even if it means increasing the ESD temperature unnecessarily. For example, the controller may charge and discharge the ESD for heating as usual, then charge and discharge the ESD at high frequency and low magnitude for the duration of one demand-averaged period after heating becomes unnecessary in order to minimize the effect that the heating has on the demand average.

In yet another embodiment, the controller may minimize the effect of not knowing the demand-averaged period timing by implementing a charge-discharge pattern similar to pattern 112 of FIG. 1B. Pattern 112 has a long-duration, low-magnitude charging portion and a short-duration, high-magnitude discharging portion for each cycle that have a net zero effect on the average demand when they are within the same demand-averaged period. If such a pattern overlaps two demand-averaged periods, one of the two periods will have its demand average increase slightly, but because of the low magnitude of the charging portion, it is less likely to drive the demand average to a new peak value in any given demand-averaged period. This beneficial pattern design is best implemented by maximizing the duration of charging and the magnitude of discharging and minimizing the duration of discharging and the magnitude of charging.

Heating Through Local Energy Exchange

In some embodiments, an additional ESD or ESDs may be used as an energy source or sink for the ESD being heated instead of the electrical distribution grid. For example, the controller may connect the ESDs to each other and allow a first ESD to discharge to a second ESD, thereby charging the second while the first is discharged, and generating heat in both ESDs simultaneously. In some embodiments the losses due to heat and other inefficiencies in such a system will eventually drive down the state of charge of these ESDs, so a supplemental energy source (e.g., the distribution grid, renewable energy source, or generator) is used to keep them from losing more than a desired state of charge or from falling below a desired level of their state of charge. If the distribution grid is used as the energy source, low-power, sustained recharging of one or more ESD may be preferred in order to minimize the impact of the charging on the average demand used in calculating the demand charges for the site. In some of these embodiments some discharge of energy from the ESDs may also be provided to the grid to counteract the effect of the recharging of the ESDs from the grid, similar to embodiments previously described herein. In these embodiments, the first and second ESD may have different properties or characteristics, may each be part of an array of ESDs, and may need converters or other electrical equipment installed between them to allow the transfer of energy to take place. These embodiments may follow patterns similar to those previously described, but instead of drawing energy to the grid connection, the ESD draws energy from the other ESD.

Embodiments that exchange energy between local devices may be advantageous because they reduce or eliminate the effect of charging and discharging the ESDs on the average demand perceived by the utility company during each demand-averaged period. Therefore, the ESDs may charge or discharge for longer periods since the demand average due to the heating does not have to be zeroed-out over the time frame defined by the demand-averaged period.

In some embodiments it may be useful to combine these local energy exchange embodiments with previously described embodiments where the ESD is connected to the grid, wherein the ESDs exchange energy between each other for periods of time where there is elevated expense of drawing energy from the grid (e.g., during peak daytime hours), but the ESDs are allowed to exchange energy with the grid over less expensive periods or when the state of charge of the ESDs drops to a critical level.

Heating with Load Shedding Offset

Load shedding (i.e., demand throttling or selective curtailment) is a method of reducing the overall demand of a site by turning down or turning off loads at the site such as lighting, freezers, air conditioning, etc. In some embodiments of the invention, the site has load shedding capability that is used in conjunction with the ESD heating processes. In these embodiments, when the ESD is charged from the grid, loads are simultaneously shed at the site to such an extent that the overall average demand does not rise (or rises at a slower rate) because the load shedding offsets the demand on the grid that comes from charging the ESD. With a sufficient amount of load shedding, the overall average demand of the site during these demand-averaged periods can be less than it would be without the ESD heating process since the ESD is still being discharged to the grid at these times and is thereby driving down the amount of consumption perceived by the utility provider.

Preheating and Precharging the ESD

Figure 4:
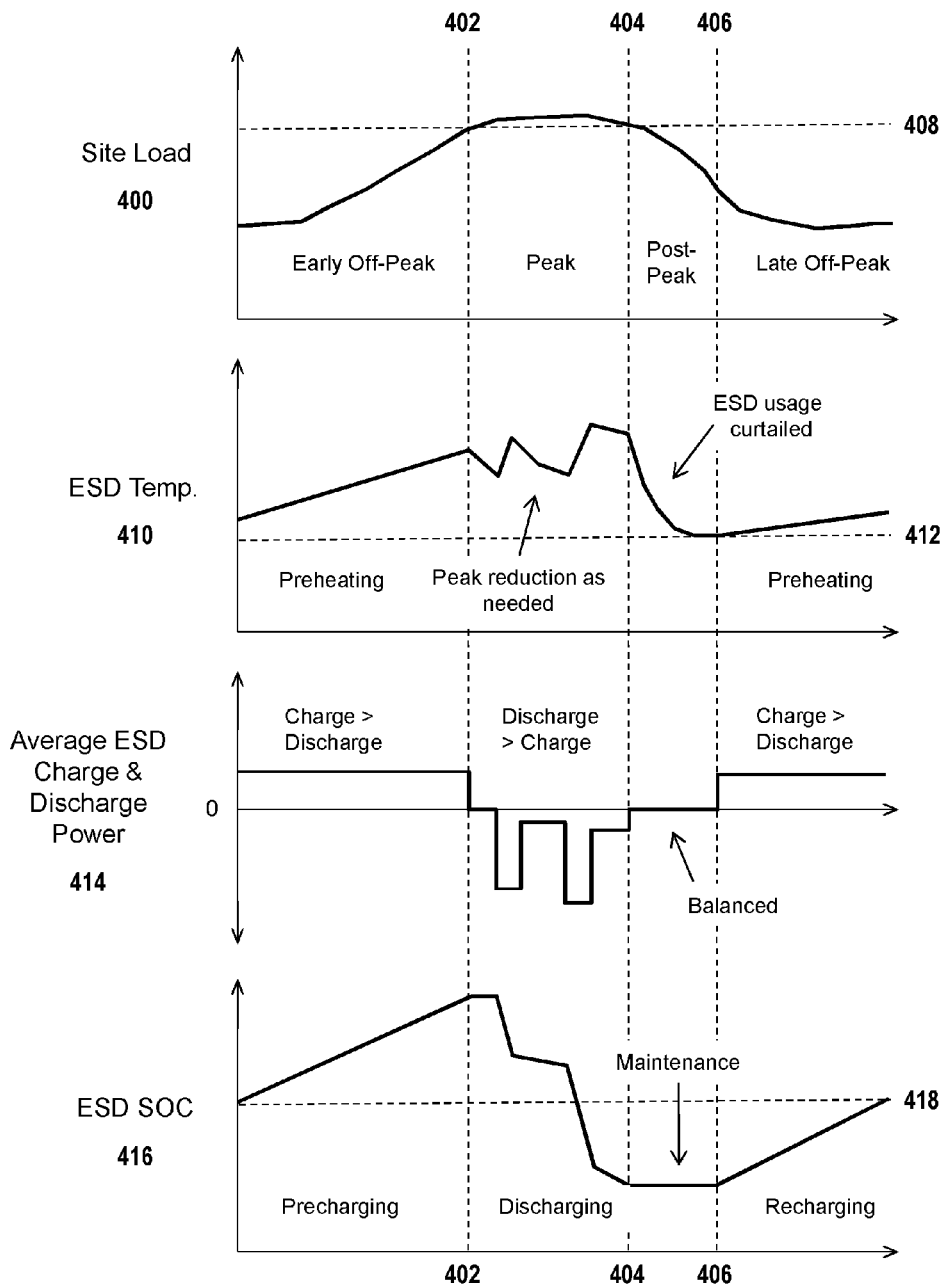
FIG. 4 is an illustration of the site load, ESD temperature, average ESD charge and discharge power, and ESD state of charge over the course of a day according to some embodiments of the invention.

In some embodiments, ESD discharge and charge power levels and durations may be adjusted in a manner that allows the state of charge or temperature to build up in anticipation of a forthcoming peak period. FIG. 4 illustrates how preheating and precharging the ESD can be beneficial. The load of a site 400 that has an ESD-based peak mitigation system is shown over the course of a day, wherein the load during an early off-peak period (from time zero to time 402) gradually rises to a high level during peak hours (time 402 to 404) and drops off during a post-peak period (time 404 to 406) and late off-peak period (time 406 to end of day). In this embodiment a peak period is defined as the time when the load of the site exceeds a peak triggering threshold 408. Thus, the ideal time to discharge the ESD is during these peak periods in order to prevent the creation of a new maximum demand average for the billing cycle. Charging the ESD drives up the average demand of the site during peak periods, so the peak mitigation system controller may preheat or precharge the system to avoid charging at these inopportune times and save it for off-peak hours when new maximum demand averages are much more unlikely to form while the ESD is charged for heating.

For example, in FIG. 4 the ESD temperature 410 is shown over the course of the day. The ESD is preheated by charging and discharging at high power levels from the start of the early off-peak period until a peak appears (e.g., until time 402 in this example). This raises the temperature of the ESD well above the temperature threshold 412 (below which threshold the ESD may risk being dangerous to operate) in anticipation of the peak period. During the peak (time 402 to 404), the ESD predominantly discharges to mitigate consumption, and little or no charging is permitted. This is shown from time 402 to 404 in the average ESD charge and discharge power chart 414. If the average activity of the ESD is discharging during the peak time of day, the ESD will not push the maximum demand average of the site any higher.

Demand charge reduction activities may raise the temperature over time, as shown by the higher ESD temperature 410 at time 404 than at time 402, but in some cases where there are insufficient demand reduction actions during the peak period, the temperature 410 may drop dramatically instead. Preheating during the early off-peak period allows the controller to avoid having to charge the ESD during the peak period for heating purposes because it will take time for the pre-raised temperature to reach the temperature threshold 412 when the ESD will need to be charged again for heating purposes.

In some embodiments, there is a post-peak period (e.g., from time 404 to 406) during which time the controller allows the ESD to cool and merely keeps the ESD temperature from falling below the temperature threshold 412. The beginning of a post-peak period is the end of the peak period, and the end of the post-peak period may be determined by option (1) the time of day when electricity rates are lower than the peak period rates (if available) or option (2) the magnitude of the site load being near the peak triggering threshold 408. If the post-peak period is determined by option (1), the post-peak period ensures that the ESD is preheated during the most cost-effective hours of the day, when time-of-day pricing is favorable to methods that predominantly charge the ESD like those found in the early off-peak and late off-peak periods. If the post-peak period is determined by option (2), limiting the usage of the ESD during the post-peak period will make it less likely that heating activities will cause the overall site load to exceed the peak triggering threshold 408 and result in new peak demand charges. After the post-peak period, the controller may resume preheating or simply prevent the ESD temperature 410 from falling below the temperature threshold 412 in the late off-peak period (e.g., from time 406 to the end of the day).

In some embodiments, disproportionate charging and discharging patterns permit the state of charge (SOC) of the ESD to be manipulated with respect to peak periods of the day. For example, in FIG. 4 the controller precharges the ESD SOC 416 during the early off-peak period by allowing more energy to flow into the ESD than flows out during that period (e.g., charging periods are greater than discharge periods while heating the ESD during that time). When the peak period starts (e.g., time 402), the SOC of the ESD 416 is much greater than its normal level 418. Therefore, the ESD charge can be used for peak mitigation during the peak period without needing to be recharged as much (if any). This is advantageous because charging during a peak period could contribute to raising the maximum demand average of the site. In this illustration, during the peak period the ESD is discharged more than it is recharged and the SOC 416 drops as energy is used to mitigate peaks in consumption. During the post-peak period from time 404 to 406, the ESD may be set to maintain SOC with a balanced charge and discharge pattern, then in the late off-peak period the ESD is disproportionately charged to bring the SOC 416 back up, e.g., to the normal level 418, at the end of the day. In these embodiments, the ESD needs heating on a regular basis to keep it from falling below the temperature threshold, so the ESD temperature of line 410 is not representative of the temperature of the ESD for which the ESD SOC 416 is shown in FIG. 4 since it is predominantly well above the temperature threshold 412.

In some related embodiments, there is a pre-peak period between the early off-peak period and the peak period wherein ESD charging is restricted because of proximity to the peak or time-of-day pricing, similar to the post-peak period. In other embodiments, there are no pre-peak, post-peak, or maintenance periods at all, and the ESD is preheated or precharged whenever the time of day is outside a peak period.

Miscellaneous Definitions and Embodiment Scope Information

Generally speaking, as used herein a "power converter" may refer to a generic electric power converter, inverter, transformer, regulator, voltage stabilizer, rectifier, power supply unit, or other conversion device or combination of these devices that may be used to convert the voltage, frequency, and/or phase of an electrical power source or signal from one form into another form.

As used herein, an "energy storage device" ("ESD") is a means for storing energy such as, for example, electrochemical batteries, compressed gas storage, pumped hydro storage, flywheel energy storage, capacitative energy storage, superconductive magnetic energy storage, fuel cell energy storage, combinations thereof, and other similar devices for energy storage known in the art. If the energy storage device includes a battery, the battery types may include rechargeable or non-rechargeable chemistries and compositions, such as, for example, lead-acid, alkaline, secondary lead acid, lithium-ion, sodium (zebra), nickel-metal hydride, nickel cadmium, combinations thereof, and other energy storage chemistries known in the art. Energy storage devices may be comprised of small or large numbers of cells, capacities, voltages, amperages, and other battery properties. They may be configured in unitary or modular designs and may follow standardized guidelines or customized specifications.

The term "computer-readable medium" as used herein includes not only a single physical medium or single type of medium, but also a combination of one or more physical media and/or types of media. Examples of a computer-readable medium include, but are not limited to, one or more memory chips, hard drives, optical discs (such as CDs or DVDs), magnetic discs, and magnetic tape drives. A computer-readable medium may be considered part of a larger device or it may be itself removable from the device. For example, a commonly-used computer-readable medium is a universal serial bus (USB) memory stick that interfaces with a USB port of a device. A computer-readable medium may store computer-readable instructions (e.g. software) and/or computer-readable data (i.e., information that may or may not be executable). In the present example, a computer-readable medium (such as memory) may be included to store instructions for the controller to operate the heating of the ESD and historical or forecasted temperature data for the ESD or its surroundings.

In some embodiments the energy storage devices may be integrated with or connected to power management systems, such as those used for peak mitigation, load leveling, or backup or uninterruptible power supplies, since they may conveniently provide the electronic equipment needed to connect an energy storage device to the distribution grid. However, energy storage devices that serve other purposes may be utilized when the necessary connecting equipment is used. Such connecting equipment may comprise power converters for changing voltage signals, inverters for changing AC signals to DC signals (or vice versa), controllers for directing the operation of the power converters, signal conditioning electronics such as stabilizing capacitors, cables, connectors, and other items required to efficiently and safely bring the stored energy to the distribution grid.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In addition, it should be understood that the figures described above, which highlight the functionality and advantages of the present invention, are presented for example purposes only and not for limitation. The exemplary architecture of the present invention is sufficiently flexible and configurable, such that it may be utilized in ways other than that shown in the figures. It will be apparent to one of skill in the art how alternative functional, logical or physical partitioning, and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in multiple various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the time described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or component of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

Further, the purpose of the Abstract is to enable the U.S. Patent and Trademark Office and the public generally, and especially the scientists, engineers, and practitioners in the art who are not familiar with patent or legal terms or phraseology to determine quickly from a cursory inspection the nature and essence of the technical disclosure of the application. The Abstract is not intended to be limiting as to the scope of the present invention in any way.

What is claimed is:

1. A method of managing the heating of an energy storage device (ESD), the ESD having an associated temperature, the method comprising:
   a. charge cycling the ESD for a charge cycling duration when said associated temperature reaches or falls below a threshold temperature, thereby generating heat within said ESD, the charge cycling comprising:
      i. discharging the ESD at a discharging power level for a discharging duration to an electrical utility distribution grid, and
      ii. charging the ESD at a charging power level for a charging duration from said electrical utility distribution grid;
   b. wherein said discharging power level, said discharging duration, said charging power level, and said charging duration are cycle parameters, and said cycle parameters are selected to keep an average effect on an average electrical demand of a utility consumer from said electrical utility distribution grid due to the charge cycling at a predetermined target value.

2. The method of claim 1, wherein the duration of discharging and charging of the charge cycling is shortened during a final period within said charge cycling duration, the final period having a duration of one demand-averaged period or longer.

3. The method of claim 1, further comprising:
   a. extending the charge cycling duration by the length of one demand-averaged period after the associated temperature rises above the threshold temperature,
   b. wherein the extended charge cycling has a duration of discharging and charging that is shortened and the cycle parameters are selected in such a manner that the average effect on the average electrical demand from said electrical utility distribution grid due to the shortened charge cycling is less than or equal to zero.

4. The method of claim 1, wherein the predetermined target value is zero.

5. The method of claim 4, wherein said discharging duration and said charging duration are both entirely within one demand-averaged period.

6. The method of claim 4, wherein the ESD has an initial state of charge before charge cycling, and a final state of charge after charge cycling, and the final state of charge is greater than or equal the initial state of charge.

7. The method of claim 4, wherein the discharging duration is shorter than the charging duration, and the discharging power level is greater than the charging power level.

8. The method of claim 1, wherein the predetermined target value is less than zero.

9. The method of claim 8, wherein said discharging duration and said charging duration are both entirely within one demand-averaged period.

10. The method of claim 8, wherein the ESD has an initial state of charge before charge cycling, and a final state of charge after charge cycling, and the final state of charge is greater than or equal to the initial state of charge.

11. The method of claim 8, wherein the ESD has an initial state of charge before charge cycling, and a final state of charge after charge cycling, and the final state of charge is less than the initial state of charge.

12. The method of claim 11, wherein charge cycling takes place during a peak billing period.

13. The method of claim 1, wherein the predetermined target value is greater than zero.

14. The method of claim 13, wherein
   a. the charge cycling takes place during a demand-averaged period of a billing cycle, the demand-averaged period having a demand average, and
   b. the predetermined target value is sufficiently large enough to raise the demand average without exceeding a previous maximum demand average of a previous demand-averaged period in the billing cycle.

15. The method of claim 14, wherein charge cycling takes place during an off-peak billing period.

16. The method of claim 13, wherein the ESD has an initial state of charge before charge cycling, and a final state of charge after charge cycling, and the final state of charge is greater than or equal to the initial state of charge.

17. The method of claim 1, wherein charging or discharging of the ESD is disabled when the associated temperature reaches or falls below a second temperature, the second temperature being lower than the threshold temperature.

18. A method of managing the heating of a first energy storage device (ESD), the first ESD having an associated temperature, the method comprising:
   discharging the first ESD at a discharging power level for a discharging duration into a second ESD and charging the first ESD at a charging power level for a charging duration from said second ESD when said associated temperature reaches or falls below a threshold temperature, thereby generating heat within the first ESD until the associated temperature rises above the threshold temperature;
   preventing a state of charge of at least one of the first ESD and the second ESD from falling below a threshold state of charge level by charging the at least one of the first ESD and the second ESD using a third energy source.

19. The method of claim 18, wherein the first ESD and the second ESD are part of the same array of energy storage devices.

20. A method of managing the heating of an energy storage device (ESD), the ESD having an associated temperature, the method comprising:
   a. raising the associated temperature above a threshold temperature during an off-peak period by alternately discharging and charging the ESD for the purpose of generating heat, wherein alternately charging and discharging the ESD is controlled to keep an average effect on an average electrical demand of a utility customer from an electrical utility distribution grid due to the charging and discharging at a predetermined value, the off-peak period preceding a peak period,
   b. disabling charging the ESD during the peak period, and
   c. enabling charging the ESD after the peak period.

21. A method of managing the heating of an energy storage device (ESD) at a site, the site having an electrical consumption level that is averaged over a demand-averaged period to form an average demand for each demand-averaged period in a billing cycle, the ESD having a state of charge, the method comprising:
   a. raising the state of charge to a value above a normal level during an off-peak period by alternately discharging and charging the ESD to generate heat in the ESD in such a manner that the ESD is charged more than discharged during the off-peak period and the average demand does not exceed a previous maximum average demand of the billing cycle, the off-peak period preceding a peak period; and b. disabling charging of the ESD during the peak period until the state of charge is depleted.

* * * * *